US012668394B2

(12) United States Patent
Wahl

(10) Patent No.: US 12,668,394 B2
(45) Date of Patent: Jun. 30, 2026

(54) LABELING MACHINE AND METHOD FOR CONFIGURING A LABELING MACHINE

(71) Applicant: KRONES AG, Neutraubling (DE)

(72) Inventor: Matthias Wahl, Langquaid (DE)

(73) Assignee: KRONES AG, Neutraubling (DE)

( * ) Notice: Subject to any disclaimer, the term of this patent is extended or adjusted under 35 U.S.C. 154(b) by 127 days.

(21) Appl. No.: 18/560,667

(22) PCT Filed: Mar. 17, 2022

(86) PCT No.: PCT/EP2022/056942
§ 371 (c)(1),
(2) Date: Nov. 13, 2023

(87) PCT Pub. No.: WO2022/238032
PCT Pub. Date: Nov. 17, 2022

(65) Prior Publication Data

US 2024/0217690 A1 Jul. 4, 2024

(30) Foreign Application Priority Data

May 12, 2021 (DE) ..................... 10 2021 112 484.0

(51) Int. Cl.
*B32B 41/00* (2006.01)
*B65C 9/40* (2006.01)

(52) U.S. Cl.
CPC ...................................... *B65C 9/40* (2013.01)

(58) Field of Classification Search
CPC .................................. B65C 9/40; B32B 41/00
(Continued)

(56) References Cited

U.S. PATENT DOCUMENTS 7,497,323 B2 3/2009 Davidson et al.
2006/0037706 A1 2/2006 Putzer
(Continued)

FOREIGN PATENT DOCUMENTS

CN 101962092 A 2/2011
CN 105073585 A 11/2015
(Continued)

OTHER PUBLICATIONS

ISA European Patent Office, International Search Report Issued in Application No. PCT/EP2022/056942, Jul. 8, 2022, WIPO, 4 pages.
(Continued)

*Primary Examiner* — Michael N Orlando
*Assistant Examiner* — Joshel Rivera
(74) *Attorney, Agent, or Firm* — McCoy Russell LLP

(57) ABSTRACT

The invention relates to a labeling machine at least for labeling and/or printing containers, in particular containers in the food industry and the drinks industry, and to a method for configuring labeling machines. An artificial intelligence method is used in order to create the configuration parameters for a labeling machine. An artificial intelligence module (AI module) receives various input data, including, among other things, datasets from configured labeling machines. The AI module creates a trained parameterization model in order to create the configuration parameters for the labeling machine. The labeling machine is configured and optimized by the configuration parameters of the AI module.

11 Claims, 3 Drawing Sheets

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 2007/0163697 A1 | 7/2007 | Kursawe | |
| 2015/0370240 A1* | 12/2015 | Püschner | G05B 19/402 700/114 |
| 2018/0201011 A1 | 7/2018 | Efner | |

FOREIGN PATENT DOCUMENTS

| | | | |
|---|---|---|---|
| DE | 4312605 | A1 | 10/1994 |
| DE | 19741476 | A1 | 3/1999 |
| DE | 102009035924 | A1 | 2/2011 |
| DE | 102011086708 | A1 | 5/2013 |
| DE | 102013202425 | A1 | 8/2014 |
| DE | 102014112483 | A1 | 3/2016 |
| DE | 102016103117 | A1 | 8/2017 |
| DE | 102019101852 | A1 | 7/2020 |
| DE | 102019203060 | A1 | 9/2020 |
| DE | 102019126947 | A1 | 4/2021 |
| EP | 1205388 | A1 | 5/2002 |
| EP | 1449778 | A1 | 8/2004 |
| EP | 1706322 | B1 | 6/2008 |
| EP | 1751008 | B1 | 8/2009 |
| EP | 2100815 | B1 | 8/2012 |
| EP | 2199220 | B1 | 8/2012 |
| EP | 3374274 | B1 | 2/2019 |
| WO | 03024861 | A1 | 3/2003 |

OTHER PUBLICATIONS

China National Intellectual Property Administration, Office Action and Search Report Issued in Application No. 202280034872.2, Aug. 27, 2025, 31 pages.

* cited by examiner

LABELING MACHINE AND METHOD FOR CONFIGURING A LABELING MACHINE

CROSS REFERENCE TO RELATED APPLICATIONS

The present application is a U.S. National Phase of International Application No. PCT/EP2022/056942 entitled "LABELLING MACHINE AND METHOD FOR CONFIGURING A LABELLING MACHINE," and filed on Mar. 17, 2022. International Application No. PCT/EP2022/056942 claims priority to German Patent Application No. 10 2021 112 484.0 filed on May 12, 2021. The entire contents of each of the above-listed applications are hereby incorporated by reference for all purposes.

TECHNICAL FIELD

The invention relates to a labeling machine for labeling and/or printing on containers, in particular containers such as bottles made of glass, plastics, cardboard or pulp material or cans, in the food industry and the drinks industry, and to a method for configuring labeling machines.

BACKGROUND AND SUMMARY

As is known, food containers, in particular beverage bottles, cans and other beverage packaging, are inscribed or labeled. In most cases, large amounts of containers have to be labeled, inscribed, printed on or coated, which also entails greater technical design effort. In order to equip such containers therewith in large numbers, labeling machines which can assume different sizes are known. In particular, larger labeling machines can be in the form of a production line and can comprise a large number of widely different modules. The modular design of such machines is known, for example, from WO03/024861A1, DE19741476A1, EP1449778A1, EP2199220B1 and EP1706322B1. Labeling machines can have a treatment carousel with fixed or variable division (EP2100815B1), a linear conveyor (DE4312605A1) or long-stator systems (DE102011086708A1, EP3374274B1) for transporting the containers in the treatment region. Labeling and/or printing modules can be positioned in this treatment region. Furthermore, orientation modules are also known in order to first rotate containers into a defined orientation position before the actual equipping process. For this purpose, electric motor-operated drives are used which, proceeding from detectable container features such as mold seam, embossing or the like, can carry out individual orientation rotations by means of a suitable control system (EP1205388A1, EP1751008B1). An orientation module thus also comprises suitable sensors or cameras for detecting the container position. In certain cases, inspection modules are also used in order to also carry out label and/or printed-image control in the machine on the containers which have finished being equipped with a label and/or printed image.

However, smaller labeling machines also comprise a plurality of different modules which cooperate during the labeling process and have to be adjusted to one another accordingly. This configuration of the labeling machine and the many modules thereof substantially consists of the adjustment of several parameters which often depend on one another. In addition to the required specialist knowledge, this object also requires a lot of technical experience and accordingly also takes up working time.

DE102019203060 A1 discloses a method for product guidance in a filling system for glass bottles. In the method, empty-container parameters and filled-container parameters and, in particular, machine error states occurring during filling are to be automatically determined. On the basis of a data analysis of stored initial data and result data, a decision about the rejection of incorrect empty bottles or full bottles is made. This data analysis for determining whether a bottle is defective or has been incorrectly filled can be carried out by machine learning processes in terms of artificial intelligence or the like.

However, no method for more efficiently configuring a labeling machine or modules of a labeling machine has hitherto been disclosed.

There is therefore a need for improved labeling machines and improved methods for configuring labeling machines.

This object is achieved according to the invention by a labeling machine according to claim 1 and by a method according to claim 6. Further embodiments and developments are described in the dependent claims.

One embodiment of the invention relates to a labeling machine for the food industry, in particular for the drinks industry. The labeling machine can comprise a plurality of modules for labeling, printing on, inscribing, coating, gluing, orienting or inspecting containers and a control unit for applying configuration parameters to the plurality of modules. The aforementioned functions can optionally be performed or can be performed in different combinations. The modules are preferably designed to be quickly replaceable in order to be able to flexibly provide a wide variety of equipment variants. For example, the machine can thus label containers in one configuration variant, whereas, in another variant, the container surface of the containers is directly printed on contactlessly by inkjet or by means of other printing methods in one or more colors. It is also possible to provide applications which require both or which are intended to enable printing/inscribing of labels, for example in order to individualize them (supplementary printing), to date them or provide them with a code. The application of adhesives to labels and/or containers can also be included.

The configuration parameters are created by means of an artificial intelligence, AI, module and the control unit transmits the configuration parameters created by the AI module to the corresponding modules in order to configure the modules.

One embodiment of the invention relates to a method for configuring a labeling machine in the food industry, in particular a labeling machine in the drinks industry. In this case, input data which relate to the labeling of a container are received. The input data can comprise parameter datasets for configured labeling machines and operation data.

Configuration parameters for the labeling machine are created by means of an AI module. The configuration parameters can be based on the received input data. The configuration parameters can then be applied to the labeling machine in order to configure one or more modules of the labeling machine. In particular, the various drives, sensors, cameras, actuators, print heads (for colors, adhesives) and their supply units are configured.

BRIEF DESCRIPTION OF THE FIGURES

Example aspects of the invention are shown in the drawings. In the figures.

DETAILED DESCRIPTION

The configuration of labeling machines is technically demanding, since a plurality of parameters must be set, some of which also depend on one another. This means that if a parameter is set correctly, changing another parameter can have an adverse effect on the parameter that is supposedly already set correctly and can change this parameter again in an unfavorable way. In order to prevent such cross effects, a large amount of experience is generally necessary in the field of labeling machines.

For example, in the case of rotary labeling machines, various electric motor-operated drives have to be parameterized in a bottle- and type-dependent manner during initial assembly or retrofitting. These include, among others, servo drives for rotary plates, a long-stator drive, in particular for transporting containers, a carousel, a drive for adjusting the height of a carousel upper part, a drive for adjusting the height of and/or radially adjusting the labeling units, adapting the label transfer members, the print heads and sensors, and many other parameters.

Figure 1:
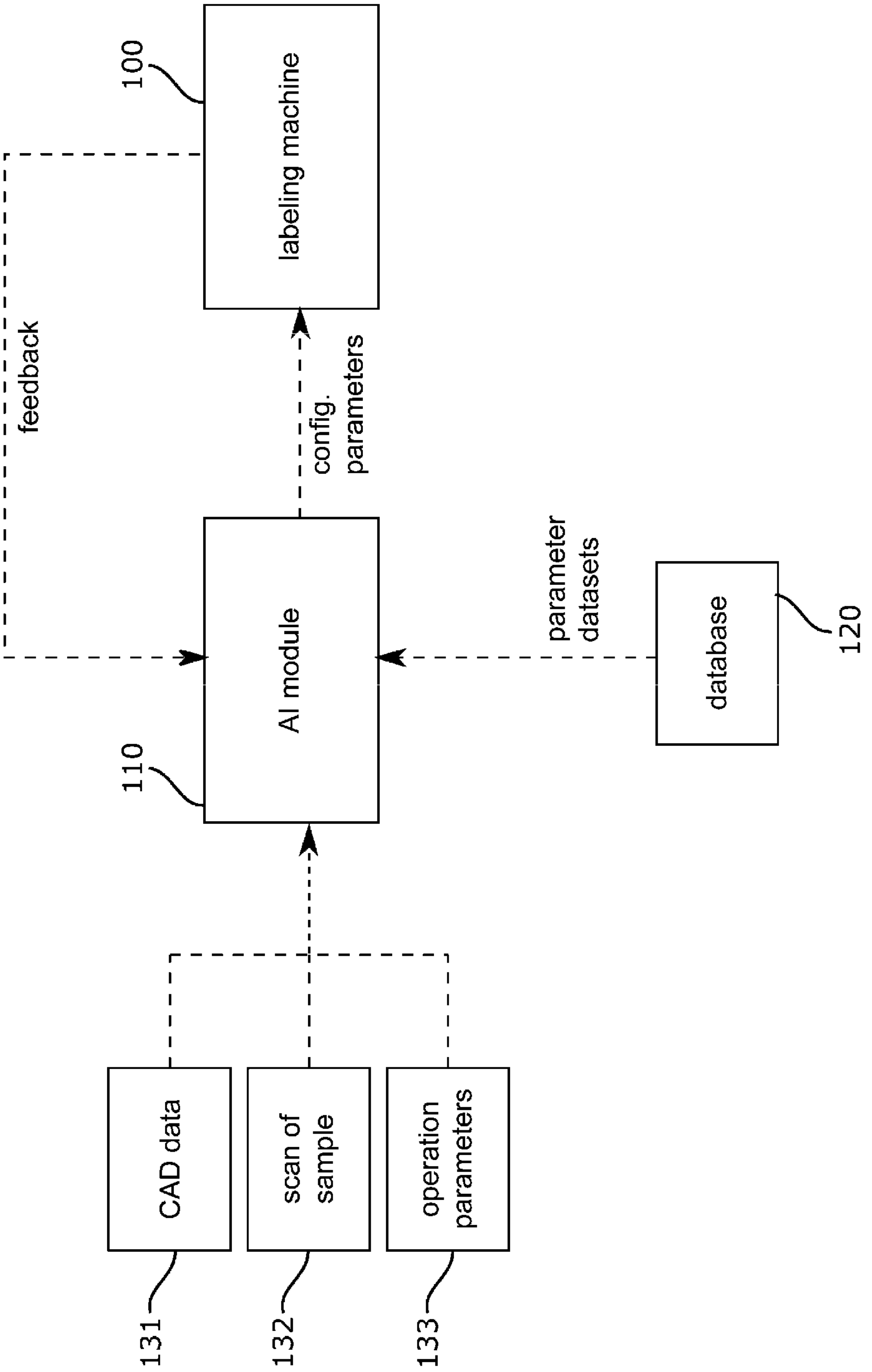
FIG. 1: shows a diagram showing an overview of a system for configuring a labeling machine by means of artificial intelligence.

As shown in FIG. 1, according to the invention an artificial intelligence module (for short: AI module) 110 is connected to a labeling machine 100. This connection is a functional connection and, according to one embodiment, includes the AI module 110 being connected to a labeling machine 100 via a network or another data connection. The AI module 110 can be connected to the labeling machine 100 as an external device. However, the invention is not limited to this embodiment and the AI module 110 can also be integrated in the labeling machine 100. For example, the AI module 100 can be implemented in a main controller of the labeling machine 100.

The AI module 110 can also be implemented on a remote server and be designed for configuring a plurality of different labeling machines 110. In this case, it is easier for the AI module 110 to have access to datasets for a large number of different modules for different labeling machines and for these datasets to be able to be extended more easily.

The AI module 110 receives or uses different datasets and creates the configuration parameters for the labeling machine 100 from these input data. In principle, in the input data, a distinction can be made between operation data and parameter datasets.

The operation data are data and information describing the framework conditions of the labeling process. These are, for example, CAD datasets for sample containers, such as a sample bottle, datasets generated by scanning a labeled/printed-on sample container, information on the labels (paper, plastics, printed image), the adhesives to be used (hot glue, casein glue, pressure-sensitive adhesive, ink) and/or optionally material specifications relating to the container and closure. A sample container may also be scanned in the machine itself by turning the sample container at least once on a rotary plate, provided that a suitable scanner (e. g., a camera) is present. By means of a scanning process, for example, geometric data (height, diameter, contour, mold seams, embossing) of the containers and information about the position of the labels/printed images can be detected. Particularly preferably, codes or printed image information on the labels or the sample container itself can also be detected in order to configure print heads or a label and/or printed image inspection process. Further operation data which are in principle required for configuring the labeling machine 100 are also conceivable.

FIG. 1 furthermore shows, by way of example, the operation data as CAD data 131, a scan of sample containers 132, such as sample bottles, and other operation parameters 133. The further operation parameters 133 can be the above-mentioned parameters relating to materials, adhesives and general information on the labeling machine 100. In other words, the operation data are shown as data blocks 131, 132 and 133 starting from the left in FIG. 1.

These operation data are used by the AI module 110 for generating configuration parameters and optimized configuration parameters, as described in more detail below.

In addition to the operation data 131, 132 and 133, the AI module 110 can use parameter datasets from a database 120 as a further type of input data. The parameter datasets in the database 120 are datasets which comprise the configuration parameters of already pre-configured labeling machines and can be used to create the new configuration parameters. Furthermore, each of these datasets can also comprise data relating to the corresponding product that is being produced by the already configured labeling machine. This can be data relating to labeled containers that have been manufactured by means of the already configured labeling machines. In other words, the database 120 stores different data from a plurality of configured labeling machines.

The AI module 110 combines and uses the different input data to create a set of configuration parameters which configures the labeling machine 100 according to the specifications of each product to be labeled and/or of the user. For example, the set of configuration parameters can configure the labeling machine 100 in such a way that the output labeled/printed-on containers correspond exactly to the CAD data 131 and/or to the scan 132 of a sample container, taking into account all the operation parameters 133.

This internal calculation of the configuration parameters can be supported by different artificial intelligence models. The configuration parameters are transmitted from the AI module 110 to the labeling machine 100, for example to the main controller of the labeling machine 100, in order to configure the labeling machine 100 by means of the corresponding configuration parameters.

After the configuration process, the labeling machine 100 can transmit information about the operation thereof and the configuration thereof back to the AI module 110; this being shown in FIG. 1 by the dashed line "Feedback". The configuration can in this case include additional manually performed further configuration and configuration parameters. This feedback of the labeling machine 100 to the AI module 110 is analyzed by the AI module 110 in order to optimize the configuration parameters and to transmit them back to the labeling machine 100. Any number of optimization iterations can occur and the reconfiguration of one or more parameters of the labeling machine 100 can also be carried out during operation as a background process. The plurality of optimization iterations can be used here for training the AI module 110 and for optimizing the model and the parameters of the model.

Different modules of the labeling machine 100 can thus be configured and adapted according to the configuration parameters of the AI module 110. For example, these modules can comprise a servo drive for rotary plates, a drive for adjusting the height of a carousel upper part and/or a drive for adjusting the height of labeling and printing units;

however, other modules can also be configured, such as an orientation or inspection module. In this way, a container-dependent turning program can be configured automatically for the rotary plates.

Likewise, the selection of the labeling and printing units, their positioning on the carousel and the registration and synchronization of the unit controller with the main machine controller can be carried out automatically without manual programming effort by means of automatic configuration.

The AI module 110 can comprise different models for machine learning and neural networks. The invention is not limited to a specific machine learning method and different AI models and machine learning methods can be used, such as supervised learning, reinforcement learning, pattern analysis and pattern detection, robotics, artificial neural networks, deep learning, classification, regression methods, clustering, time series analysis, self-learning systems, etc.

Figure 2:
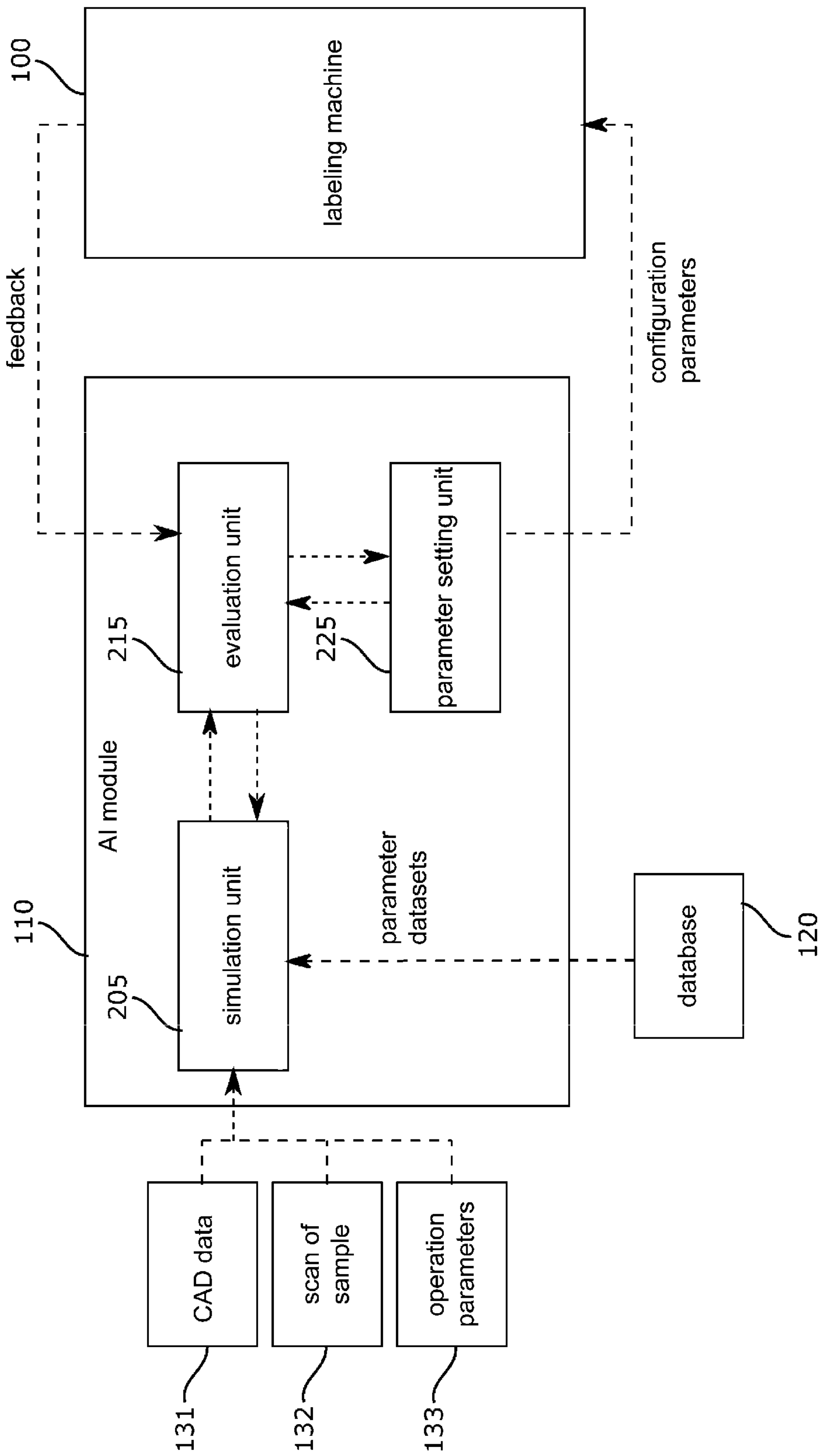
FIG. 2: shows a diagram, as shown in FIG. 1, containing further details of the artificial intelligence module.

FIG. 2 shows the AI module 110 from FIG. 1 with further details of an example embodiment. The AI module 110 can comprise a simulation unit 205, an evaluation unit 215 and a parameter setting unit 225.

The simulation unit 205 receives the input data, as described above in FIG. 1, and applies the corresponding AI method to the input data. For example, the simulation unit 205 can simulate the labeling machine 100 and the modules thereof in a virtual simulation environment and apply configuration parameters for configuring the simulated modules to the simulated labeling machine. The simulation output by the simulation unit 205 is output to the evaluation unit 215. The evaluation unit 215 analyzes the data of the simulation unit 205 and determines whether the configuration settings initially defined by the simulation unit lead to results that can be utilized. The configuration parameters are optimized and created by feedback relating to the evaluation from the evaluation unit 215 to the simulation unit 205.

It should be noted here that it is not necessarily the task of the simulation unit 215 to carry out a simulation, but said unit is substantially responsible for creating a configuration model or parameterization model. This can be done, for example, by means of machine learning methods on the basis of the input data described above.

The parameterization model generated in this way, i.e., the configuration parameters of the labeling machine 100, can then be validated and optimized as part of the interaction between the simulation unit 205 and the evaluation unit 215.

As soon as the evaluation unit 215 determines that the evaluation results of the configuration parameters are sufficient, the data are transferred to the parameter setting unit 225. The parameter setting unit 225 extracts the configuration parameters from the data and transmits them to the labeling machine 100.

The configuration parameters are applied in the labeling machine 100 in order to configure the individual modules.

As soon as the labeling machine 100 is configured using the configuration parameters created by the AI module 110, the feedback data are reported back from the labeling machine 100 to the AI module 110, as described above. In particular, the feedback data can be transmitted to the evaluation unit 215 in the AI module, which unit analyzes and evaluates the result. This analysis can be fed back into the simulation unit 205 and used for optimization purposes. As a result, any number of iterations can be carried out until the configuration parameters are set optimally.

A plurality of iterations allows the learning effect of the AI module 110 to be boosted and the configuration parameters generated by artificial intelligence can optimize the configuration of the labeling machine 100 within a short period.

Figure 3:
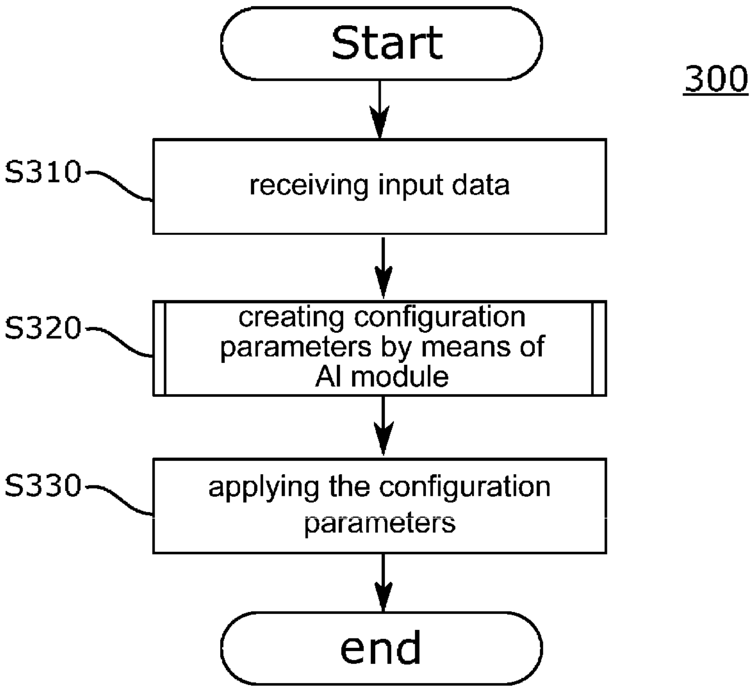
FIG. 3: shows a method for configuring a labeling machine.

FIG. 3 shows a method 300 for configuring the labeling machine 100, as is preferably carried out by the AI module 110.

Firstly, the AI module 110 receives the input data in step S310. The input data can comprise the CAD data 131, the scans 132 of the sample container, the operation parameters 133 and/or the parameter datasets from the database 120.

In step S320, the AI module 110 creates, from the input data, the configuration parameters which serve to configure the labeling machine 100 and/or the corresponding modules of the labeling machine 100. This step, step S320, can be executed, for example, by the steps and modules described in connection with FIG. 2. Further details of this step, S320, will be described below with reference to FIG. 4.

In step S330, the configuration parameters from step S320 are applied to the labeling machine 100 and/or to the modules of the labeling machine 100. In this case, "application" means that the configuration parameters can be transmitted, for example, to a main controller of the labeling machine 100, which configures and adjusts the corresponding modules by means of the configuration parameters.

Figure 4:
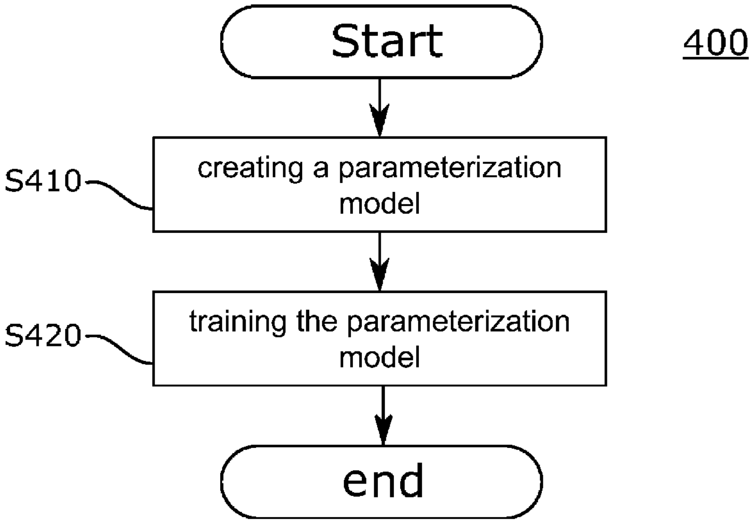
FIG. 4: shows a method for creating and training a parameterization model.

FIG. 4 shows a method 400 with further details regarding the creation of the configuration parameters.

In step S410, a parameterization model is created on the basis of the received input data. As described above, the parameterization model can comprise, for example, a model of the labeling machine 100, which model is simulated by various parameters.

In step S420, the parameterization model is trained. For example, the parameterization model can be trained by means of the AI module 110 on the basis of the parameter datasets of configured labeling machines. The configuration parameters are thus derived from the trained parameterization model.

The technical implementation of the use of artificial intelligence to set configuration parameters for a machine and in particular for a labeling machine greatly reduces the time and labor effort and in the process can also help to improve and optimize the configuration of already configured corresponding machines.

The invention claimed is:

1. A labeling machine for the food industry, in particular for the drinks industry, wherein the labeling machine comprises:

a plurality of modules at least for labeling and/or printing on containers;

a control unit for configuring the plurality of modules in accordance with configuration parameters for the plurality of modules, wherein:

the configuration parameters are created by means of an artificial intelligence, AI, module; and the control unit transmits the configuration parameters created by the AI module to the corresponding modules in order to configure the modules, wherein the labeling machine is configured to:

transmit information about the operation thereof and the configuration thereof back to the AI module, and receive optimized configuration parameters from the AI module, the optimized configuration parameters having been optimized by the AI module.

2. The labeling machine according to claim 1, wherein the plurality of modules comprises at least one of the following modules:

a servo drive for rotary plates, a long-stator drive, in particular for transporting containers, a carousel, a drive for adjusting a height of a carousel upper part, a drive for adjusting a height of and/or for radially adjusting labeling and/or printing units, a drive for adapting label transfer members, print heads and/or sensors.

3. The labeling machine according to claim 1, wherein the configuration parameters created by the AI module are created on the basis of data from configured labeling machines.

4. The labeling machine according to claim 1, wherein the configuration parameters created by the AI module are created on the basis of operation data, and wherein the operation data comprises at least one of the following: CAD data for a sample container, a scan of a container, information on labels, information on adhesives to be used, information on the material of the containers, information on a container closure.

5. The labeling machine according to claim 1, wherein the control unit also automatically makes at least one of the following adjustments:

selecting labeling and/or printing units;

positioning the labeling and/or printing units on a carousel or a long-stator drive;

registering and synchronizing a unit controller with a main machine controller;

configuring a process of applying adhesive according to a label position and/or a label contour;

configuring a direct printing process, wherein parameters for one or more print heads are configured for printing on a container.

6. A method for configuring a labeling machine in the food industry, in particular for a labeling machine in the drinks industry, wherein the method comprises:

receiving input data relating to at least the labeling and/or printing on a container, wherein the input data comprise parameter datasets for configured labeling machines and operation data;

creating, by means of an artificial intelligence, AI, module, configuration parameters for the labeling machine, wherein the configuration parameters are based on at least the received input data;

applying the configuration parameters in order to configure a plurality of modules of the labeling machine, wherein the plurality of modules are designed at least for labeling and/or printing on containers;

transmitting information about the operation thereof and the configuration thereof back to the AI module, and receiving optimized configuration parameters from the AI module, the optimized configuration parameters having been optimized by the AI module.

7. The method according to claim 6, wherein the creation of configuration data also comprises:

creating a parameterization model on the basis of the received input data; and training, by means of the AI module 110, the parameterization model on the basis of the parameter datasets of configured labeling machines, wherein the configuration parameters are derived from the trained parameterization model.

8. The method according to claim 6, wherein the plurality of modules comprise at least one of the following modules:

a servo drive for rotary plates, a long-stator drive, in particular for transporting containers, a carousel, a drive for adjusting a height of a carousel upper part, a drive for adjusting a height of and/or radially adjusting labeling and/or printing units, a drive for adapting label transfer members, print heads and/or sensors.

9. The method according to claim 6, wherein the operation data comprise at least one of the following: CAD data for a sample container, a scan of the container, information on labels, information on adhesives to be used, information on the material of the containers, information on a container closure.

10. The method according to claim 6, wherein the configuration parameters are configured to automatically adjust at least one of the following settings:

selecting labeling and/or printing units;

positioning the labeling and/or printing units on a carousel or a long-stator drive;

registering and synchronizing a unit controller with a main machine controller;

configuring a process of applying adhesive according to a label position and/or a label contour;

configuring a direct printing process, wherein parameters for one or more print heads are configured for printing on the container.

11. The labeling machine according to claim 1, wherein the AI module comprises a simulation unit and an evaluation unit, wherein the control unit creates the configuration parameters are by means of the AI module based on feedback relating to the evaluation from the evaluation unit to the simulation unit, and wherein the simulation unit simulates the labeling machine in a virtual simulation environment and applies configuration parameters for configuration simulated modules to generate simulated output which is evaluated by the evaluation unit wherein the simulation unit applied configuration parameters for configuring the simulated modules to the simulated labeling machine, and wherein the evaluation unit sends the evaluated data back to the simulation unit for optimization.

* * * * *